US010452655B2

(12) United States Patent
Lahorani et al.

(10) Patent No.: US 10,452,655 B2
(45) Date of Patent: Oct. 22, 2019

(54) IN-MEMORY CURSOR DURATION TEMP TABLES

(71) Applicant: Oracle International Corporation, Redwood Shores, CA (US)

(72) Inventors: Janaki Latha Lahorani, San Ramon, CA (US); You Jung Kim, Palo Alto, CA (US); Andrew Witkowski, Foster City, CA (US); Sankar Subramanian, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 202 days.

(21) Appl. No.: 15/268,519

(22) Filed: Sep. 16, 2016

(65) Prior Publication Data
US 2017/0116266 A1    Apr. 27, 2017

Related U.S. Application Data

(60) Provisional application No. 62/245,867, filed on Oct. 23, 2015.

(51) Int. Cl.
*G06F 17/30* (2006.01)
*G06F 16/2453* (2019.01)
*G06F 16/2455* (2019.01)

(52) U.S. Cl.
CPC .. *G06F 16/24532* (2019.01); *G06F 16/24539* (2019.01); *G06F 16/24561* (2019.01)

(58) Field of Classification Search
CPC .................................................. G06F 17/30
USPC ....................................................... 707/602
See application file for complete search history.

(56) References Cited

U.S. PATENT DOCUMENTS

| 5,367,677 | A | 11/1994 | Stanfill |
| 5,546,571 | A | 8/1996 | Shan |
| 5,822,750 | A | 10/1998 | Jou |
| 7,146,370 | B1 | 12/2006 | Klindt |
| 7,174,327 | B2 | 2/2007 | Chau |
| 8,176,265 | B2* | 5/2012 | Coon ............... G06F 12/084 711/150 |
| 8,396,325 | B1 | 3/2013 | Kwatra |
| 8,660,985 | B2* | 2/2014 | Wang ............... G06F 16/283 707/602 |

(Continued)

OTHER PUBLICATIONS

Ziauddin, U.S. Appl. No. 15/268,528, filed Sep. 16, 2016, Office Action, dated Jul. 27, 2018.

(Continued)

*Primary Examiner* — Kim T Nguyen
(74) *Attorney, Agent, or Firm* — Hickman Palermo Becker Bingham LLP

(57) ABSTRACT

Techniques are provided herein for processing a query using in-memory cursor duration temporary tables. The techniques involve storing a part of the temporary table in memory of nodes in a database cluster. A part of the temporary table may be stored in disk segments of nodes in the database cluster. Writer threads running on a particular node writes data for the temporary table to the memory of the particular node. Excess data may be written to the disk segment of the particular node. Reader threads running on the particular node reads data for the temporary table from the memory of the particular node and the disk segment of the particular node.

14 Claims, 6 Drawing Sheets

(56) References Cited

U.S. PATENT DOCUMENTS

| | | |
|---|---|---|
| 9,092,484 B1 | 7/2015 | Abraham |
| 9,177,027 B2 | 11/2015 | Kitsuregawa |
| 9,971,808 B2 * | 5/2018 | Kamath .............. G06F 16/221 |
| 2005/0131800 A1 | 6/2005 | Yoaz |
| 2006/0080285 A1 | 4/2006 | Chowdhuri |
| 2006/0235818 A1 | 10/2006 | Muras |
| 2007/0239691 A1 | 10/2007 | Ordonez |
| 2007/0283356 A1 * | 12/2007 | Du ..................... G06F 9/30123 |
| | | 718/102 |
| 2008/0162409 A1 | 7/2008 | Meijer |
| 2010/0088325 A1 | 4/2010 | Goldstein |
| 2010/0191716 A1 | 7/2010 | Chen |
| 2010/0211577 A1 | 8/2010 | Shimizu |
| 2011/0010139 A1 | 1/2011 | Fuhrmann |
| 2011/0047364 A1 * | 2/2011 | Koju ..................... G06F 9/3834 |
| | | 712/228 |
| 2011/0252033 A1 * | 10/2011 | Narang ............... G06F 16/325 |
| | | 707/737 |
| 2012/0036146 A1 | 2/2012 | Annapragada |
| 2013/0073538 A1 | 3/2013 | Beerbower |
| 2013/0262443 A1 | 10/2013 | Leida |
| 2013/0275365 A1 * | 10/2013 | Wang ................... G06F 16/283 |
| | | 707/602 |
| 2014/0095526 A1 | 4/2014 | Harada |
| 2014/0181144 A1 | 6/2014 | Kashiyama |
| 2014/0280020 A1 | 9/2014 | Singamshetty |
| 2015/0261820 A1 | 9/2015 | Cheng |
| 2015/0278309 A1 | 10/2015 | Harada |
| 2015/0379077 A1 | 12/2015 | Grosse |
| 2016/0034521 A1 | 2/2016 | Lumby |
| 2016/0232206 A1 | 8/2016 | Hayamizu |
| 2016/0378751 A1 * | 12/2016 | Kamath ................ G06F 16/221 |
| | | 707/747 |
| 2016/0378754 A1 * | 12/2016 | Kamath ................ G06F 16/221 |
| | | 707/747 |
| 2017/0116272 A1 | 4/2017 | Lahorani et al. |

OTHER PUBLICATIONS

Lahorani, U.S. Appl. No. 15/268,522, filed Sep. 16, 2016, Office Action, dated Aug. 15, 2018.

Louiqa Raschid et al., "A Parallel Processing Strategy for Evaluating Recursive Queries", dated Aug. 1986, 8 pages.

Ashdown et al., "Oracle Database SQL Tuning Guide 12c Release 1(12.1)", dated May 2013, 566 pages.

Ziauddin, U.S. Appl. No. 15/268,528, filed Sep. 16, 2016, Final Office Action, dated Feb. 21, 2019.

Lahorani, U.S. Appl. No. 15/268,522, filed Sep. 16, 2016, Final Office Action, dated Jan. 11, 2019.

Ziauddin, U.S. Appl. No. 15/268,528, filed Sep. 16, 2016, Office Action, dated Jul. 26, 2019.

Ziauddin, U.S. Appl. No. 15/268,335, filed Sep. 16, 2016, Office Action, dated May 31, 2019.

Ziauddin, U.S. Appl. No. 15/268,528, filed Sep. 16, 2016, Interiview Summary, dated May 16, 2019.

Ziauddin, U.S. Appl. No. 15/268,528, filed Sep. 16, 2016, Advisory Action, dated May 21, 2019.

Lahorani, U.S. Appl. No. 15/268,522, filed Sep. 16, 2016, Interview Summary, dated Mar. 22, 2019.

* cited by examiner

IN-MEMORY CURSOR DURATION TEMP TABLES

BENEFIT CLAIM

This application claims the benefit of Provisional Application No. 62/245,867, filed Oct. 23, 2015, the entire contents of which is hereby incorporated by reference as if fully set forth herein, under 35 U.S.C. § 119(e).

FIELD OF THE INVENTION

The present invention relates to processing queries in a multi-node database system. Specifically, the present invention relates to using temporary tables to process multi-stage queries in a multi-node database system.

BACKGROUND

In a clustered database system, multiple "nodes" may have access to the same on-disk copy of a database. Typically, each node is a computing device with its own local memory and processors that are running one or more database instances. The database server instances on each of the nodes may receive queries to access the data. A query coordinator may assign work to be performed for the query among multiple worker threads running on the nodes in the database system, in order to process the query in parallel.

A complex query may be executed in multiple stages. During execution of the query, results generated by a stage may be used by another subsequent stage. These results are temporarily stored on a shared disk so that they can be accessed by other nodes using temporary tables.

However, storing the temporary table on the shared disk has significant overhead costs. The temporary segments for each worker must be allocated beforehand, and the size may be much larger than what is required for queries with small results. Furthermore, reading and writing to a disk is slower than reading and writing from local volatile memory.

If the query is processed in parallel by a plurality of worker threads, each worker thread may write temporary results to a segment on the shared disk. When all the worker threads have finished writing data to their respective segment, the query coordinator merges the segments. A merge operation is a metadata operation that defines the extents from various temporary segments as belonging to the same temporary segment. Subsequent stages may read the plurality of extents now merged into a single temporary segment as from a single shared table.

Although a merge may only involve metadata, the merge is performed serially by a single process. Thus, even though the rest of an operation may be processed in parallel, the merge may take a long time and cause significant delays. For example, for a small set of results, the plurality of segments may take only a short amount of time to write to, but then there would be a delay while the query coordinator merges the segments.

Furthermore, reading and writing to a disk is slower than reading and writing to volatile memory. For parallel queries, after the worker threads have finished writing to the temporary table, there is a delay as the query coordinator needs to merge the segments at the end of the table population process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
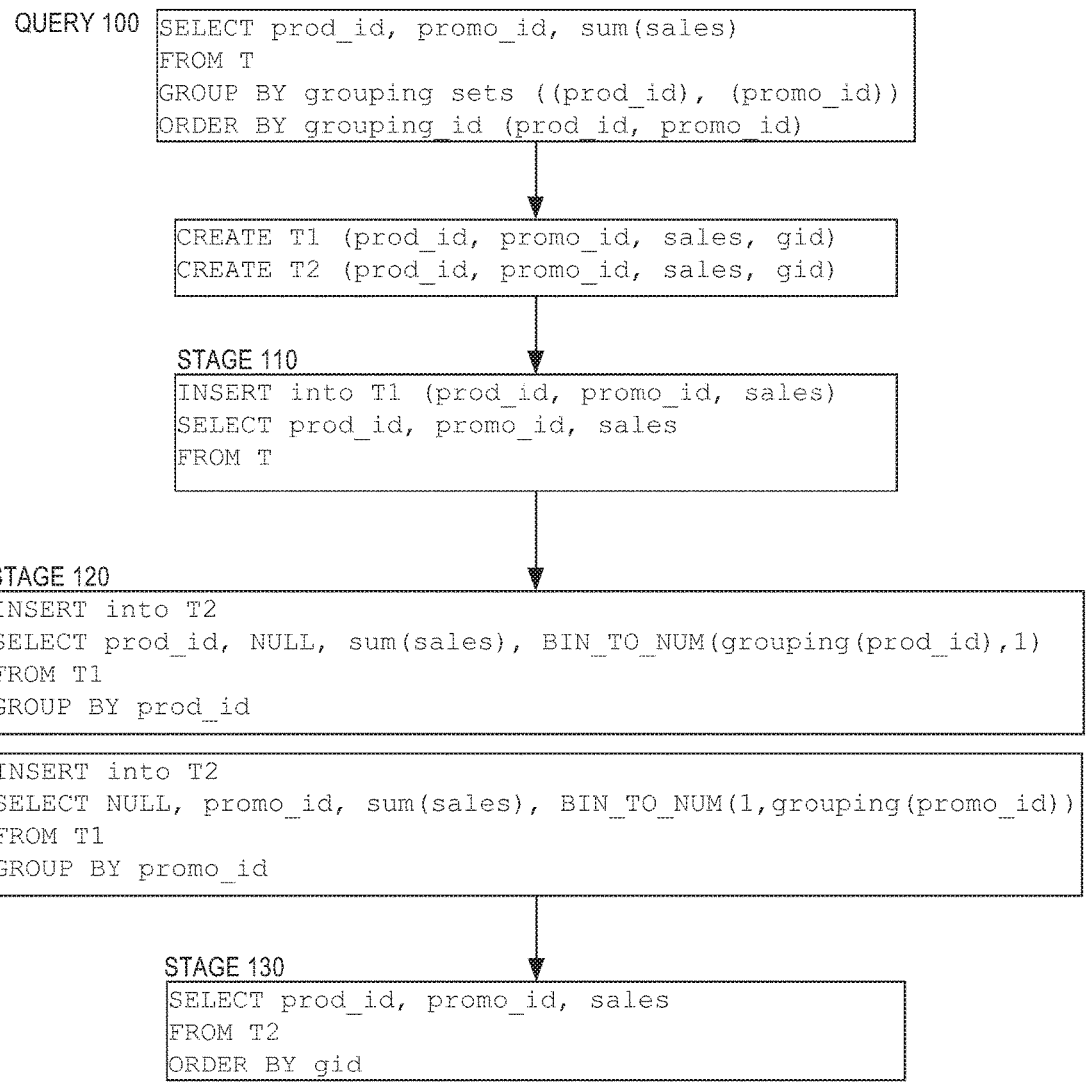
FIG. 1 is a block diagram illustrating a query divided into sub-queries.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

To avoid the overhead caused by storing cursor duration temporary tables on disk, techniques are presented herein for storing cursor duration temporary tables in local volatile memory of nodes in a clustered database system.

In an embodiment, a portion of memory in each node of a clustered database system is allocated for storing in-memory cursor duration temporary tables. One or more writer threads running on a node writes data for a part of an in-memory cursor duration temporary table to the respective memory portion. One or more reader threads running on the node reads from the part of the in-memory cursor duration temporary table stored in the respective memory portion.

In an embodiment, the portion of memory on each node is divided into one or more memory segments. Each of the one or more writer threads running on a node is assigned a memory segment for writing data for the in-memory cursor duration temporary table. Each of the one or more reader threads may read from any memory segment from the memory of the node it is running on.

Cursor Duration Temporary Tables

Various database languages, such as SQL, support special-purpose constructs referred to herein as "cursors." During compilation of a query statement, the database server may perform a significant amount of preliminary work for the statement, such as parsing, semantic analysis, and query plan generation. A cursor stores much of the preliminary work. One set of information stored in a cursor includes the execution plan for performing the operations specified by the SQL statement.

An execution plan defines operations to be performed to execute a query and an order for performing the operations, known as plan operations. When a database instance receives a query, a query coordinator formulates a query execution plan for executing the query. A plan operation may generate output that is stored in a temporary table for use during execution of another plan operation. These temporary results are stored in tables referred to herein as cursor duration temporary tables (CDTs). Using CDTs to store temporary intermediate results may improve query processing performance or to support complex multi-stage query execution. For example, queries that include With Clause, Grouping Sets, Star Formation, XLATE, and/or Frequent Item Set Counting are types of queries that may use CDTs.

Unlike other, persistent tables in the database, CDTs are not defined in the system-wide database dictionary, which is stored persistently on disk. A CDT may instead be defined temporarily in shared RAM memory, such as low latency byte addressable memory. The definition of the CDT is valid for the duration of a cursor. The data in the CDT is kept for the duration of the query (cursor) execution. After the query execution finishes, the data in the CDT is truncated.

A DBMS may execute the execution plan as a distributed operation. Plan operations may be divided into work granules, some of which may be executed in parallel by a plurality of slave processes or threads. A slave process may contain one or more threads, and could be referred to as a thread when the slave processes comprises a single thread. A thread, when reading data, could be referred to as a reader thread. A thread, when writing data, could be referred to as a writer thread.

Typically, a query coordinator generates work granules and assigns the work granules to slave processes. In some embodiments, rather than the query coordinator generating and assigning work granules to slave processes, slave processes assign their own work granules. Each slave process may determine a work granule to execute and then indicate the next work granule a slave process can execute. For example, when reading from a CDT, a slave process may determine that a first work granule includes reading a portion of the CDT and a second work granule includes reading the next portion of the CDT. The slave process may select and execute the first work granule. Either the slave process or other free slave processes may select and execute the second work granule.

If the query execution plan requires the use of CDTs, then one or more temporary tables are created and the plan operations are written to reference the one or more temporary tables. FIG. 1 illustrates an example query and an execution plan for executing the query. For the purpose of illustration, assume table T includes columns "prod_id," "promo_id," and "sales." Query 100 is the original query received, which selects "prod_id," "promo_id," and the sum of "sales" from table T. Query 100 further groups the results by two grouping sets: first by "prod_id," then by "promo_id."

Based on the components of query 100, the query coordinator generates an execution plan for executing query 100. It creates two temporary tables, T1 and T2, to store partial results of query 100. In the present example, the execution plan comprises three stages, illustrated by the SQL statements in stage 110, stage 120, and stage 130.

In stage 110, data from columns "prod_id," "promo_id," and "sales" are retrieved from source table T and stored in temporary table T1. In an embodiment, source table T may comprise a complex join involving a plurality of tables. Any joins, selections, and/or projections are computed, and the result is stored in table T1.

At stage 120, two subsequent sets of groups are computed. The first is based on "prod_id" and the second based on "promo_id." For each set of groups, the temporary table T1 is scanned to compute the group, and the results are stored into temporary table T2.

At stage 103, the two sets of groups that were computed in stage 120 and stored in temporary table T2 are retrieved, ordered based on grouping_id, and returned.

"In-memory" cursor duration temporary tables refer to CDTs that are stored primarily in RAM memory. In a clustered database system, a portion of local RAM memory from each node in the cluster may be used to store in-memory CDTs.

The in-memory CDT may be divided into portions and each portion is stored in the local memory of a node in the database cluster. In an embodiment, the in-memory CDT comprises a plurality of data blocks, and one or more data blocks may be stored in the respective local memory of each node. The work for executing each plan operation may be distributed among slave processes running on nodes in the database cluster. Each slave process reads and writes to the local memory of its respective node.

In the present example, work for stage 110, 120, and 130 may be parallelized by a plurality of slave processes. For example, the plurality of slaves may each scan a portion of table T, execute the grouping operation, and store their respective results in memory as a portion of table T1 and T2. Processes for reading and writing to in-memory CDT are further described in detail below.

System Overview

Figure 2:
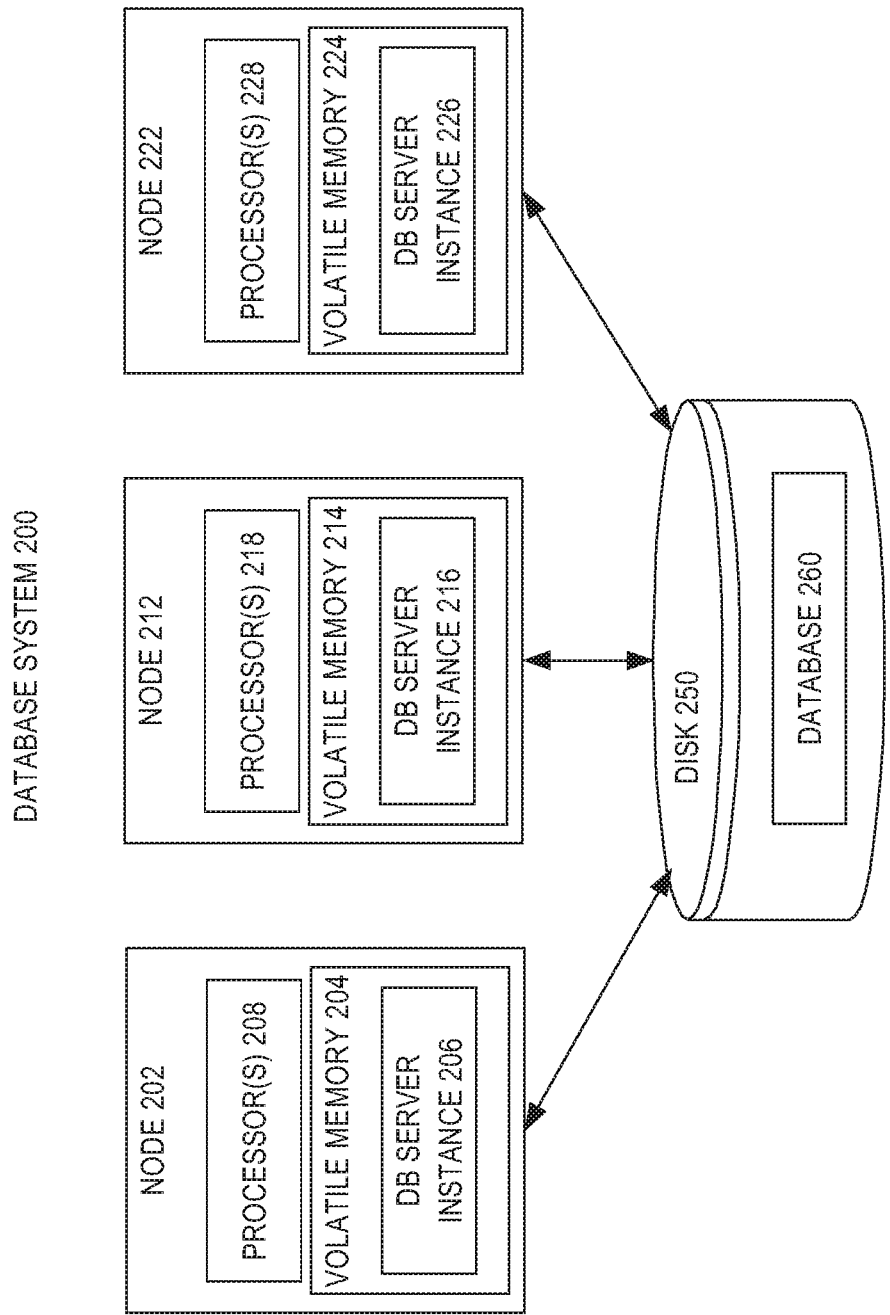
FIG. 2 is a block diagram illustrating a multi-node database system.

FIG. 2 depicts a multi-node database system on which an embodiment may be implemented. In the embodiment illustrated in FIG. 2, system 200 comprises three nodes 202, 212, and 222. Although three nodes are shown in the present illustration, in other embodiments, system 200 may comprise more or fewer nodes.

Nodes 202, 212, and 222 have access to the same database 260. For the purpose of illustration, database 260 is shown as stored on a single shared disk 250, but in alternative embodiments may be spread across multiple disks to which each of nodes 202, 212, and 222 have access.

Nodes 202, 212, and 222 respectively have one or more processors 208, 218, and 228, and local RAM memory 204, 214, and 224. In addition, nodes 202, 212, and 222 are respectively executing database server instances 206, 216, and 226. While in the illustrated embodiment each node is executing a single database server instance, in alternative embodiments, a single node may execute more than one database server instance.

Figure 3:
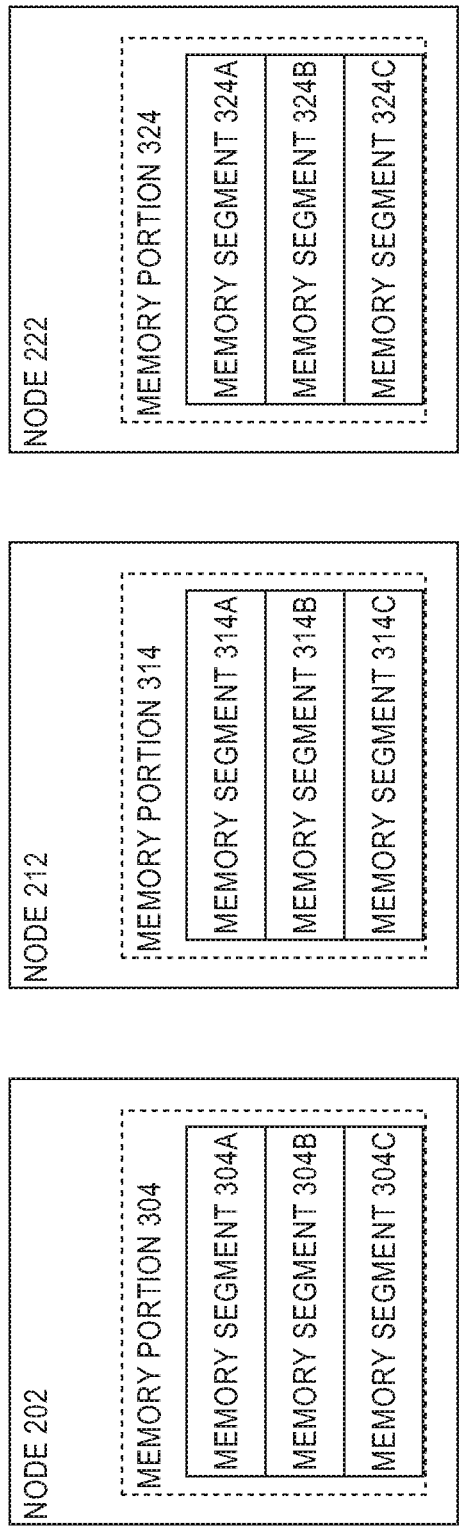
FIG. 3 is a block diagram illustrating memory portions for storing temporary tables.

A portion of the local memory for each node may be used to store in-memory CDT data. FIG. 3 illustrates the CDT memory portions in local memory of nodes in the database system. Local memory 204, 214, and 224 comprise memory portion 304, 314, and 324, respectively. In an embodiment, memory portions 304, 314, and 324 are allocated on start-up of the query that uses nodes 202, 212, and 222 for in-memory CDTs. Memory portions 304, 314, and 324 may only be directly accessed by processes running on the respective nodes. For example, memory portion 304 may only be used by a process running on processor 208. Similarly, memory portion 314 may only be used by a process running on processor 218. While in the illustrated embodiment each local memory comprises a single memory portion, in alternative embodiments, a node may have more or fewer memory portions.

In an embodiment, memory portion 304, 314, and 324 may be further divided into a plurality of "memory segments." Each memory segment may be assigned to a process running on the one or more processors 208, 218, and 228, of the node the memory portion belongs to. In one embodiment, each node has a different number of memory segments. In another embodiment, each node may have the same size memory portion and/or each memory portion may have the same number of memory segments. In the present example, memory portion 304 comprises memory segments 304a, 304b, and 304c; memory portion 214 comprises memory segments 314a, 314b, and 314c; and memory portion 324 comprises memory segments 324a, 324b, and 324c. In an embodiment, each memory segment is the same size. In other embodiments, memory segments may be of different sizes.

In an embodiment, one or more portions of shared disk 250 are also used to store the in-memory CDTs. The portions may be allocated when a database system starts, or may be allocated during query processing.

The portions of shared disk 250 may be further divided into a plurality of "disk segments." In an embodiment, a disk segment is allocated to a process writing in-memory CDT data to a memory segment when the CDT data requires more space than the memory segment holds. In another embodiment, each process writing in-memory CDT data is assigned a disk segment at the start of writing in-memory CDT data, regardless of the size of the CDT data.

In some embodiments, each node may have access to a respective local disk. One or more portions of the respective local disk may be used to store in-memory CDT data for each node in addition to, or instead of, using one or more portions of shared disk 250.

Writing to In-Memory Cursor Duration Temporary Tables

After the query coordinator determines the query execution plan, it assigns work for the query to one or more database instances in the database system. In an embodiment, one or more slave processes running on each of the processors are assigned to write in-memory CDT data for the query. Each node in the system may have a different number of slave processes running on its respective processor.

Figure 4A:
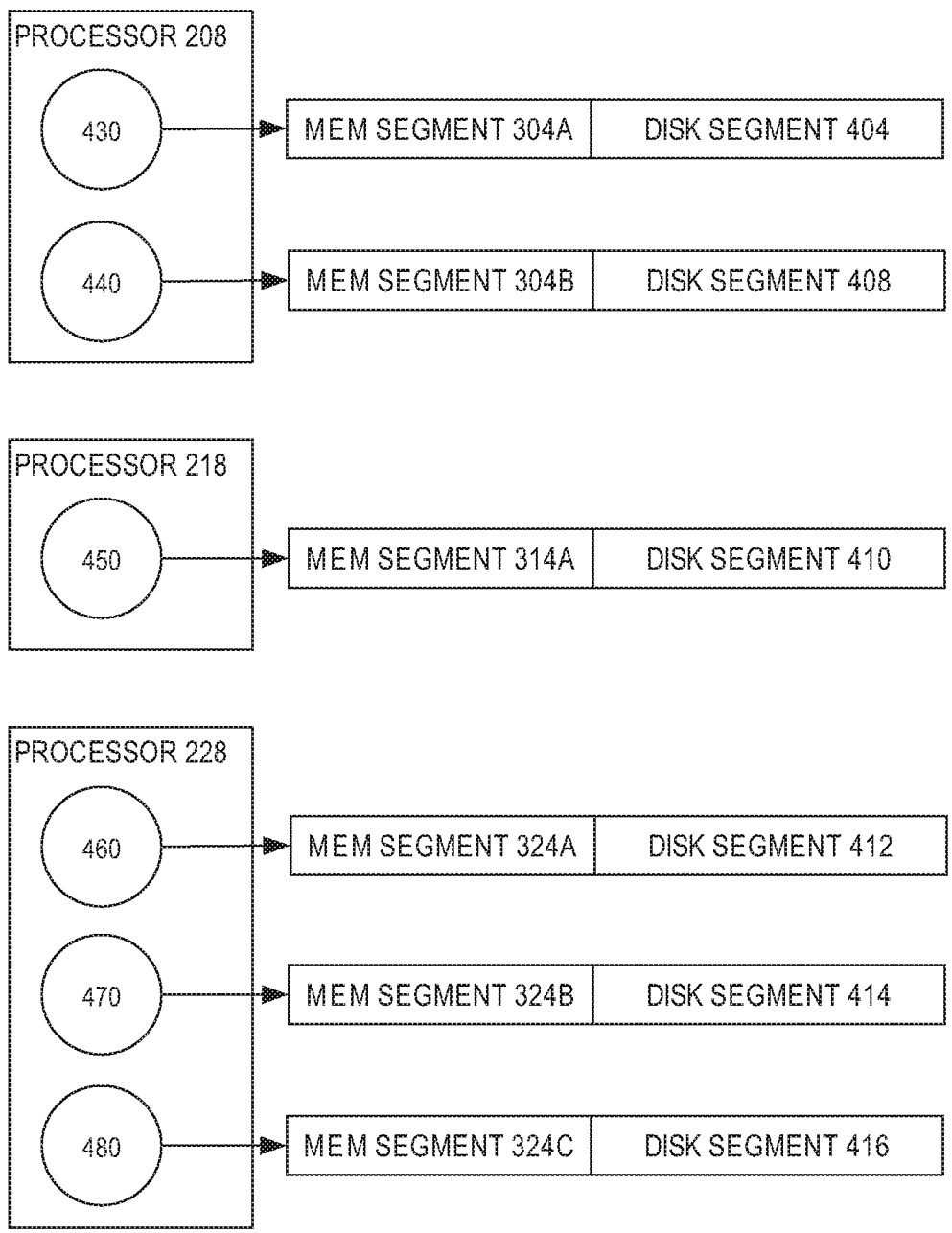
FIG. 4A is a block diagram illustrating memory and disk segments assigned to writer threads.

Each slave process may be allocated a memory segment and a disk segment for storing CDT data. Referring to FIG. 4A, it depicts a plurality of slave processes with their associated memory segment and disk segment. Processor 208 at node 202 is running slave processes 430 and 440. Processor 218 at node 212 is running slave processes 450. Processor 228 is at node 222 is running slave processes 460, 470, and 480.

Each slave process is assigned a memory segment from the memory of the node on which it is running. Each slave process writes CDT data to its assigned memory segment. Each slave processes may also be assigned a disk segment. In an embodiment, the disk segment is not assigned until a slave process requires the additional storage. The slave process may request a disk segment to be allocated during processing of the query.

In the present illustration, slave process 430 is assigned memory segment 304A and a disk segment 404. Slave process 440 is assigned memory segment 304B and disk segment 408. Slave process 450 is assigned memory segment 314A and disk segment 410. Slave process 460 is assigned memory segment 324A and disk segment 312. Slave process 470 is assigned memory segment 324B and disk segment 414. Slave process 480 is assigned memory segment 324C and disk segment 416.

In one embodiment, the plurality disk segments contains a larger percentage of data than the plurality memory segments. This may occur, for example, if the data to be written requires much more space than the memory in the memory segment. It may be more desirable to store the CDT data only on disk segments rather than in memory segments. In an embodiment, at a threshold percentage of allocated disk segments, CDT data is transferred to disk from the memory segments. The memory segments are released for use in other queries.

After all slave processes finish writing data to their respective memory segments and/or disk segments, writing to the in-memory CDT is completed.

Reading from In-Memory Cursor Duration Temporary Tables

When the data stored in the in-memory CDT is required, one or more slave processes are assigned to read from the in-memory CDT. In an embodiment, each slave process may only read from memory segments from the local memory of the node it is running on. Thus, each node that had a slave process assigned to write CDT data must have at least one slave process assigned to read the CDT data. After a slave process finishes writing CDT data and is released, it may be used to read CDT data.

Figure 4B:
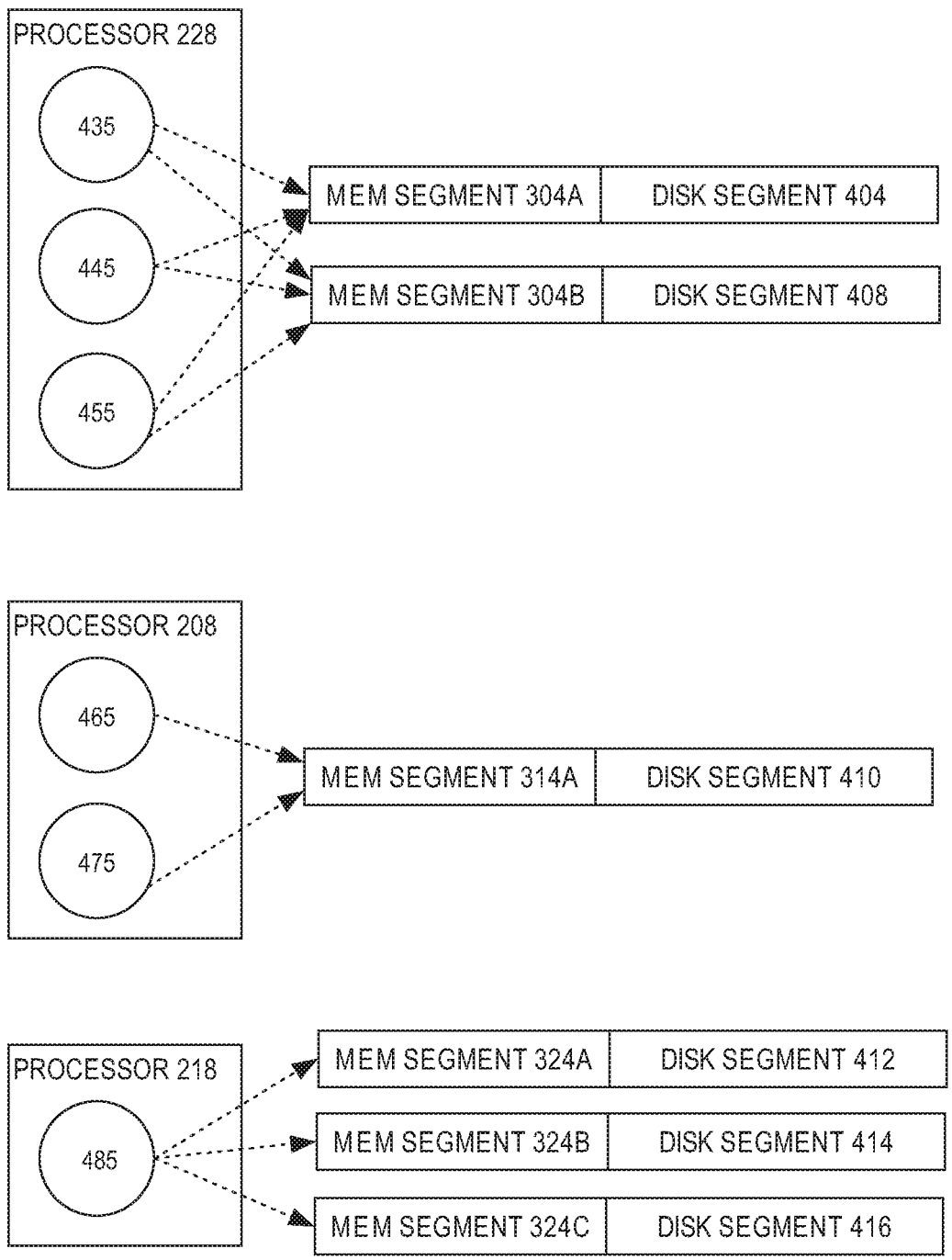
FIG. 4B is a block diagram illustrating reader threads and the associated memory and disk segments.

Referring to FIG. 4B, it depicts a plurality of slave processes and the memory segments and disk segments the slave processes may read from. Slave processes 435, 445, and 455 running on processor 228 may read from memory segment 304A, memory segment 304B, disk segment 404, and disk segment 408. Slave processes 465 and 475 running on processor 208 may read from memory segment 314A and disk segment 410. Slave process 485 running on processor 208 may read from memory segment 324A, memory segment 324B, memory segment 324C, disk segment 41, memory segment 414, and disk segment 416.

In an embodiment, rather than having a query coordinator assign segments to each slave process to read, the slave processes each assign a particular memory segment or disk segment to itself. The database system stores a data structure that indicates disk and memory segment information. The data structure may include information about the number of segments, the size and location of each segment, and pointers to each segment. A slave process uses the data structure to select a segment to read, locks the segment, and reads from the segment.

In an embodiment, a slave process may read a portion of a disk or memory segment. A segment may comprise a plurality of data blocks. The slave process reads a number of data blocks and progresses the pointer in the data structure to that point. The next slave process that reads from the segment starts at the pointer location where the slave process stopped.

In an embodiment, disk and memory segments are divided into granules, and the data structure indicates the location and number of granules. A slave process uses the data structure to determine whether a valid next granule is available to read. If any granules remain, it selects the next granule, moves the next available granule pointer and reads the selected granule.

The query coordinator receives the data from the slave processes and processes it for use in subsequent query processing.

DBMS Overview

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMS's, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database, as well as other kinds of operations. A database command may be in the form of a database statement that conforms to a database language. A database language for expressing the database commands is the Structured Query Language (SQL). There are many different versions of SQL, some versions are standard and some proprietary, and there are a variety of extensions. Data definition language commands are issued to a database server to create or configure database objects, such as tables, views, or complex data types. DDL commands are used to configure a database server for a particular hardware environment, to configure computer resource usage of the database server, as well as other operating aspects of the database server.

A multi-node database management system is made up of interconnected nodes that share access to the same database or databases. Typically, the nodes are database server hosts interconnected via a network and share access, in varying degrees, to shared storage, e.g. shared access to a set of disk drives and data blocks stored thereon. Each node in a multi-node database system hosts a database server. A server, such as a database server, is a combination of software and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to as a "server instance" or "instance." A database server may comprise multiple database instances, some or all of which are running on separate computers, including separate server blades.

The term process refers to a computer system process, which is described below in the HARDWARE OVERVIEW. Processes that comprise a database server run under the control of the database server (i.e. can be created or terminated by the database server) and perform various database server functions. Such processes are referred to herein as database server processes. Database server processors include listeners, garbage collectors, log writers, "server processes" for database sessions for executing database commands issued by database clients (including processes executing within shared sessions), and recovery processes.

Data Blocks

A data block is a unit of persistent storage and is used by a database server to store one or row more database rows, or portions of rows, including one or more columns of a row. When rows are read from persistent storage, a data block containing the row is copied into a data block buffer in RAM and/or main memory of a database server. A data block usually contains multiple rows, and data block metadata describing the contents of the data block. Metadata includes control and formatting information, such as offsets to sequences of bytes representing rows or other data structures, and a list of transactions affecting a row.

A data block is referred to as being atomic because, at least in part, a data block is the smallest unit of database data a database server may request from a persistent storage device. For example, when a database server seeks a row that is stored in a data block, the data block may only read the row from a persistent storage device by reading in the entire data block.

A data block is associated with a data block address that uniquely identifies the data block and the data block's storage location within a storage device. A database server may request from a storage device a data block by data block address, or even by primary block address ranges of data blocks.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
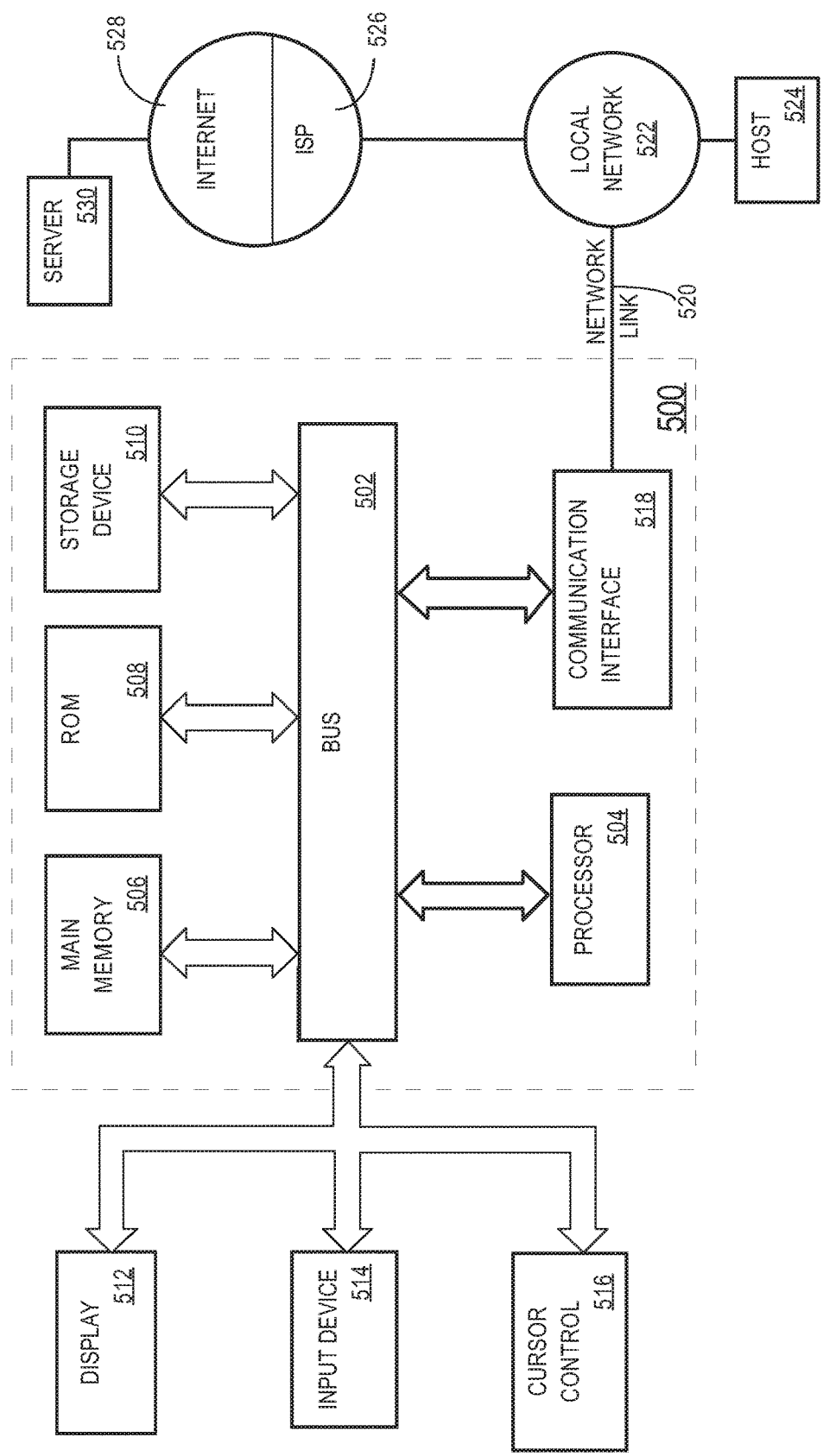
FIG. 5 is a block diagram illustrating a computer system that may be used to implement the techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system. A computer system process may divide execution of a set of instructions into one or more process threads. Process threads running within the same computer system process may run concurrently and may share resources such as the allotment of memory for the computer system process.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of processing a query on a multi-node database system against a shared database, the method comprising:
    assigning multiple threads on each node of a plurality of nodes of said multi-node database system for processing the query, said multiple threads including a plurality of writer threads and a plurality of reader threads;
    wherein for each node of said multi-node database system:
        one or more respective writer threads from said plurality of writer threads run on said each node, and
        one or more respective reader threads from said plurality of reader threads run on said each node;
    creating an in-memory temporary table for storing intermediate results generated for said query, wherein a memory of each node of said multi-node database system stores a respective local in-memory temporary table part of said in-memory temporary table;

on each node of said multi-node database system, the one or more respective writer threads writing to the respective local in-memory temporary table part of said each node;

on each node of said multi-node database system, generating a respective data structure based on the respective local in-memory temporary table part of said each node; and on each node of said multi-node database system, based on the respective data structure of, said each node, the one or more respective reader threads of said each node reading from the respective local in-memory temporary table part of said each node.

2. The method of claim 1, further comprising:

wherein said memory of each node of said multi-node database system comprises respective one or more memory segments; and on each node of said multi-node database system, assigning a respective memory segment to each of the one or more respective writer threads of said each node.

3. The method of claim 2, wherein for each node of said multi-node database system, writing to the respective local in-memory temporary table part comprises each writer thread of said one or more respective writer threads writing to the respective memory segment assigned to said each writer thread.

4. The method of claim 2, wherein for each node of said multi-node database system, the respective data structure of said each node maps the respective local in-memory temporary table part of said each node to the respective one or more memory segments of said each node and reading from the respective local in-memory temporary table part comprises reading from the respective one or more memory segments of said each node.

5. The method of claim 2, the method further comprising: for each node of said multi-node database system:

wherein a respective disk accessible to said each node comprises one or more disk segments; and assigning a respective disk segment of the respective disk to each of the one or more respective writer threads of said each node.

6. The method of claim 5, the method further comprising:

for each node of said multi-node database system, each writer thread of the one or more respective writer threads writing to the respective disk segment assigned to the writer thread when additional space is needed than is available in a respective memory segment.

7. The method of claim 6, wherein for each node of said multi-node database system:

the respective data structure of said each node maps the respective in-memory temporary table part of said each node to the respective one or more memory segments of said each node and the respective one or more disk segments accessible to said each node; and reading from the respective local in-memory temporary table part of said each node comprises reading from the respective one or more memory segments of said each node and the respective one or more disk segments accessible to said each node.

8. One or more non-transitory computer-readable media storing instructions, wherein the instructions include instructions which, when executed by one or more hardware processors, cause:

assigning multiple threads on each node of a plurality of nodes of a multi-node database system for processing a query, said multiple threads including a plurality of writer threads and a plurality of reader threads;

wherein for each node of said multi-node database system:

one or more respective writer threads from said plurality of writer threads run on said each node, and one or more respective reader threads from said plurality of reader threads run on said each node;

creating an in-memory temporary table for storing intermediate results generated for said query, wherein a memory of each node of said multi-node database system stores a respective local in-memory temporary table part of said in-memory temporary table;

on each node of said multi-node database system, the one or more respective writer threads writing to the respective local in-memory temporary table part of said each node;

on each node of said multi-node database system, generating a respective data structure based on the respective local in-memory temporary table part of said each node; and on each node of said multi-node database system, based on the respective data structure of said each node, the one or more respective reader threads of said each node reading from the respective local in-memory temporary table part of said each node.

9. The one or more non-transitory computer-readable media of claim 8, wherein said memory of each node of said multi-node database system comprises respective one or more memory segments, the instructions further including:

instructions which, when executed by one or more hardware processors, cause on each node of said multi-node database system, assigning a respective memory segment to each of the one or more respective writer threads of said each node.

10. The one or more non-transitory computer-readable media of claim 9, wherein for each node of said multi-node database system, writing to the respective local in-memory temporary table part comprises each writer thread of said one or more respective writer threads writing to the respective memory segment assigned to each writer thread.

11. The one or more non-transitory computer-readable media of claim 9, wherein for each node of said multi-node database system, the respective data structure of said each node maps the respective local in-memory temporary table part of said each node to the respective one or more memory segments of said each node and reading from the respective local in-memory temporary table part comprises reading from the respective one or more memory segments of said each node.

12. The one or more non-transitory computer-readable media of claim 9, the instructions further including:

instructions which, when executed by one or more hardware processors, cause for each node of said multi-node database system:

wherein a respective disk accessible to said each node comprises one or more disk segments; and assigning a respective disk segment of the respective disk to each of the one or more respective writer threads of said each node.

13. The one or more non-transitory computer-readable media of claim 12, the instructions further including:

instructions which, when executed by one or more hardware processors, cause for each node of said multi-node database system, each writer thread of the one or more respective writer threads writing to the respective disk segment assigned to the writer thread when additional space is needed than is available in a respective memory segment.

14. The one or more non-transitory computer-readable media of claim 13, wherein for each node of said multi-node database system:

the respective data structure of said each node maps the respective in-memory temporary table part of said each node to the respective one or more memory segments of said each node and the one or more disk segments accessible to said each node; and reading from the respective local in-memory temporary table part of said each node comprises reading from the respective one or more memory segments of said each node and the respective one or more disk segments accessible to said each node.

* * * * *

UNITED STATES PATENT AND TRADEMARK OFFICE
CERTIFICATE OF CORRECTION

PATENT NO. : 10,452,655 B2  
APPLICATION NO. : 15/268519  
DATED : October 22, 2019  
INVENTOR(S) : Lahorani et al.

Page 1 of 1

It is certified that error appears in the above-identified patent and that said Letters Patent is hereby corrected as shown below:

On page 2, Column 2, under Other Publications, Line 15, delete "Interiview" and insert -- Interview --, therefor.

In Column 11, Line 14, in Claim 1, delete "of," and insert -- of --, therefor.

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*